Nov. 10, 1925.
E. S. FARROW, JR
1,560,554
PROCESS OF TREATING CELLULOSE ACETATE REACTION MIXTURES
Filed Aug. 4, 1924
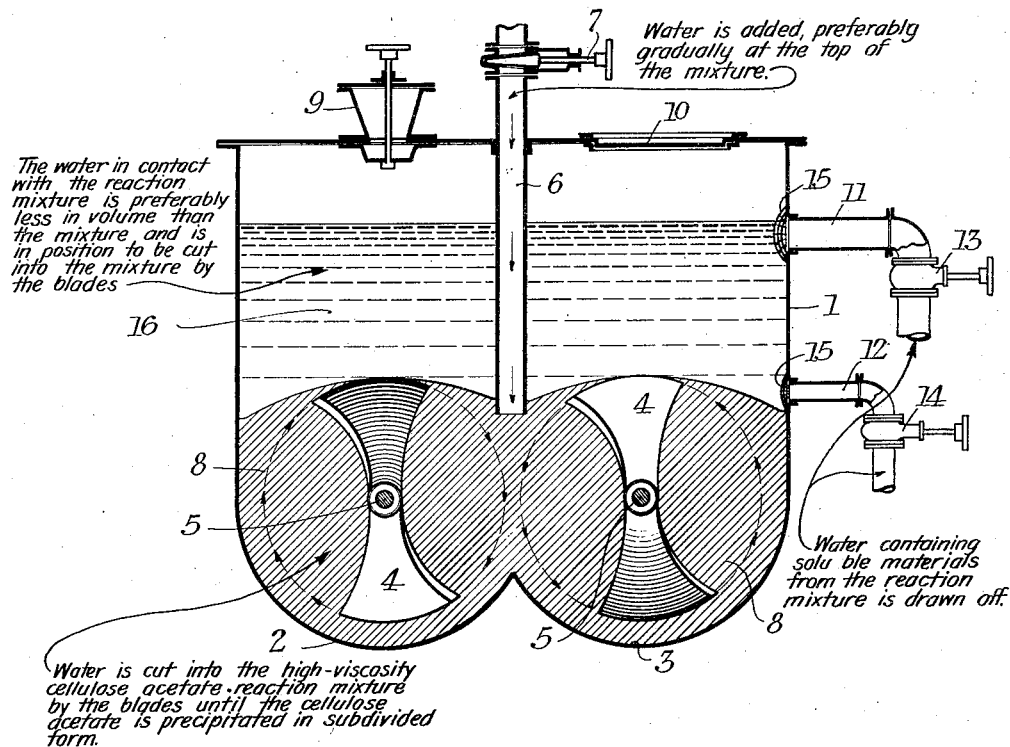
INVENTOR,
Edward S. Farrow Jr.
BY
ATTORNEY.

Patented Nov. 10, 1925.

1,560,554

UNITED STATES PATENT OFFICE.

EDWARD S. FARROW, JR., OF ROCHESTER, NEW YORK, ASSIGNOR TO EASTMAN KODAK COMPANY, OF ROCHESTER, NEW YORK, A CORPORATION OF NEW YORK.

PROCESS OF TREATING CELLULOSE-ACETATE REACTION MIXTURES.

Application filed August 4, 1924. Serial No. 730,119.

*To all whom it may concern:*

Be it known that I, EDWARD S. FARROW, Jr., a citizen of the United States of America, residing at Rochester, in the county of Monroe and State of New York, have invented certain new and useful Improvements in Processes of Treating Cellulose-Acetate Reaction Mixtures, of which the following is a full, clear, and exact specification.

This invention relates to processes of treating cellulose acetate reaction mixtures. One object of the invention is to provide a process for treating cellulose acetate reaction mixtures which are especially viscous, so as to simply and reliably precipitate and subdivide the cellulose acetate in condition for further purification or treatment. Another object is to provide a process which may be carried out in a relatively small working or factory space. A still further object is to provide a process in which the precipitating liquid can be kept small, relative to the reaction mixture, so as to provide a concentrated liquor from which by-products and excess ingredients can be more readily recovered. Yet another object of the invention is to provide a process in which the precipitating liquid may, if desired, be added and drawn off continuously. Other objects will hereinafter appear.

In the accompanying drawing the single figure is a diagrammatic side elevation, partly in vertical section, showing one form of apparatus in which my process may be conveniently carried out, the relative sizes of the parts being exaggerated for the sake of clearness.

Cellulose acetate reaction mixtures contain in solution, or partial solution, cellulose acetate and various by-products or excess ingredients. It is highly desirable to separate the cellulose acetate from the other ingredients, and moreover obtain it in a subdivided form. It is also desirable to recover the by-products and excess ingredients. But such separation and recovery present a difficult technical problem when the reaction mixtures are highly viscous. Mixtures of unusually great viscosity are obtained, for example, when relatively small amounts of acetic acid are present as a solvent; and they are likewise obtained when the maximum amount of cellulose acetate is dissolved in nitric acid for hydrolysis, in accordance with the disclosure in my co-pending application, No. 670,173, filed Oct. 22, 1923, for process of treating cellulose acetate.

Reaction mixtures of heavy viscosity can not be poured into water to precipitate the cellulose acetate in the customary manner. Nor can they be efficiently dumped en masse into a large body of water and then be stirred up in it.

I have found that the problem can be solved by associating water with the mass only gradually, and forcing it mechanically through the mass by suitable agitating means, such as blades. And I prefer to keep the amount of water, which is in contact with the mass, less than the volume of the latter. For example, I may dump a reaction mass, which is too viscous to be poured and handled by the ordinary methods, into a mixer of the type shown in U. S. Patent No. 534,968, Pfleiderer, Feb. 26, 1895, machine for mixing, kneading or otherwise treating plastic masses. The blades are then set in motion and water is gradually added, say by being poured, a relatively small amount at a time, on the top of the mass as the blades are cutting through it. By keeping the total water in the mixer at any one time relatively small, say less than the volume of the mixture, the apparatus in which the process is carried out can be kept within small factory space, and the water takes up the by-products and excess ingredients in strong solution. The liquor is drawn off when it becomes sufficiently concentrated for efficient recovery of the dissolved materials. The liquor may be drawn off and fresh water added intermittently, or these operations may be carried on continuously, which is convenient in large scale work.

In this way the cellulose acetate gradually becomes precipitated in a desirable state of subdivision. The water is carried uniformly through the mass in small amounts by each blade movement, so that eventually all of the particles of the mass are treated. This tends toward uniformity in the action as distinguished from the results obtained when a large mass or lump of the difficultly manipulable mixture is dumped into a large body of water, which acts on it only at the outer surface, and dilutes the extracted materials so that their recovery is made difficult. When the action has been carried on to the point where the precipitation, subdivision, and extraction are sufficiently complete, the materials are removed from the mixer and final washing, if necessary, and any other usual or desired treatments then take place in the usual way.

Referring to the drawing, 1 is the main vessel in which the process may be carried out. This is preferably air-tight except for the piping hereinafter described. Its bottom is divided into two troughs 2, 3 above which are located mixing blades 4 rotated with shafts 5 by any suitable means (not shown). I prefer to have the blades of the well known form in which they not only cut the material transversely but impart a longitudinal movement to it also.

Entering into the top of vessel 1 and discharging at a point closely adjacent the meeting point of the paths of the blades 4 is a pipe 6 controlled by a valve 7. The highly viscous reaction mixture 8 is loaded into the vessel, say through the fixture 9 until its upper face is approximately at the maximum height attained by the blades 4, although it may be dropped somewhat below this. The lower end of pipe 6 may be above the upper surface of the mixture 8, or may be beneath it, say a slight distance as shown in the drawing. In the top of the vessel 1 there is a removable cover 10 through which the product may be conveniently unloaded. In the side of the vessel 1 there are one or more pipes 11, 12 controlled by valve 13, 14, through which the water, carrying soluble materials, such as acetic acid, may be removed. The inner ends of the pipes are preferably screened at 15. Ordinarily it is sufficient to use merely the upper pipe 11 which is adjacent the normal working level of the water 16 in the vessel.

In brief the viscous reaction mixture 8 is loaded into the vessel 1 through fixture 9 until its upper surface assumes the proper level. Water is then added through pipe 6 and the blades cut into the mixture 8 so that water is gradually brought through the entire viscous mass by the blades and the cellulose acetate is precipitated in subdivided form. Fresh water is constantly being cut into the mass, and water containing acetic acid and other soluble materials from the mass is constantly being evolved from the upper surface of the mass. This solution of acetic acid is then drawn off through the pipes 11 or 12. The flow of water from pipe 6 and its exit through pipe 11 may be correlated so that the operation is continuous.

Having thus described my invention, what I claim as new and desire to secure by Letters Patent is:

1. The process of separating and subdividing cellulose acetate from a reaction mixture of high viscosity, which comprises forcing blades through said mixture and gradually adding liquid water during said forcing of said blades until cellulose acetate is precipitated in subdivided form.

2. The process of separating and subdividing cellulose acetate from a reaction mixture of high viscosity, which comprises forcing blades through said mixture and maintaining liquid water in contact with said mixture, during said forcing of said blades, the volume of water in contact with said mixture being less than the volume of the latter, such action, being continued until the cellulose acetate is precipitated in subdivided form.

3. The process of separating and subdividing cellulose acetate from a reaction mixture of high viscosity, which comprises forcing blades through said mixture, supplying water for said blades to carry through the mixture, and drawing off water through the mixture and containing water-soluble materials from said mixture.

4. The process of separating and subdividing cellulose acetate from a reaction mixture of high viscosity, which comprises forcing blades through said mixture, supplying water for said blades to carry through the mixture, and drawing off water through the mixture and containing water-soluble materials from said mixture, the volume of water in contact with said mixture at all times being kept less than the volume of said mixture.

5. The process of separating and subdividing cellulose acetate from a reaction mixture of high viscosity, which comprises forcing blades through said mixture, supplying water for said blades to carry through the mixture, and drawing off water carried through the mixture and containing water-soluble materials from said mixture, and recovering said materials from the water.

Signed at Rochester, New York this 24th day of July, 1924.

EDWARD S. FARROW, Jr.